United States Patent Office 3,531,684
Patented Sept. 29, 1970

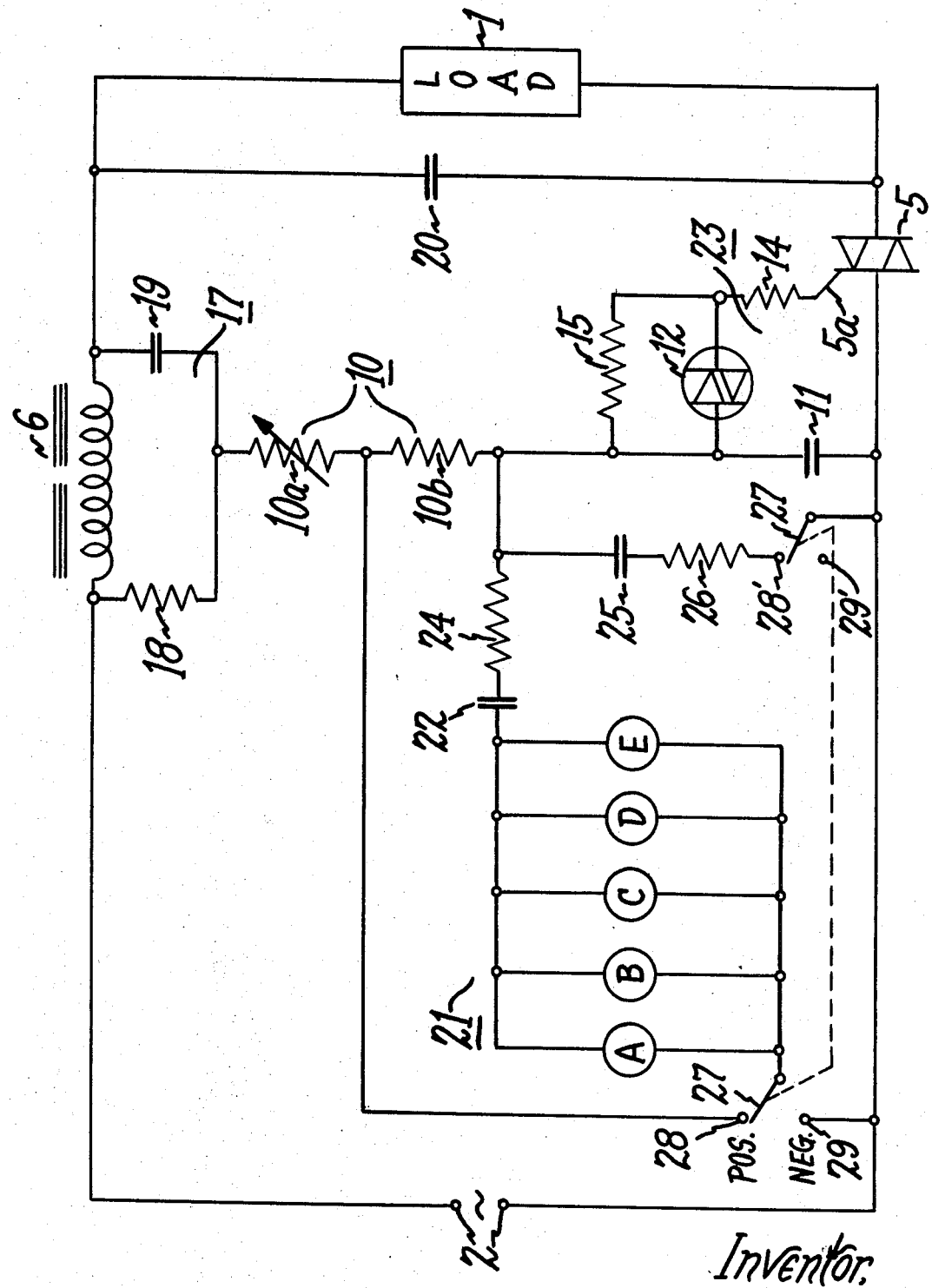

3,531,684
DISCHARGE LAMP CIRCUIT FOR CONTROL OF LIGHT INTENSITY
Joe A. Nuckolls, Hendersonville, N.C., assignor to General Electric Company, a corporation of New York
Filed Dec. 31, 1968, Ser. No. 788,237
Int. Cl. G05f 1/40, 5/00; H05b 41/392
U.S. Cl. 315—155                                      9 Claims

ABSTRACT OF THE DISCLOSURE

Circuit for controlling operation of gaseous discharge lamp in response to various ambient conditions includes phase control switch and actuating circuit therefor for controlling operation of the lamp load, a plurality of sensor devices in parallel connected across the switch actuating circuit for operating the same at desired power level in response to differing ambient conditions, and switch means for alternatively connecting the parallel sensor devices across different portions of the actuating circuit for selectively providing responses of the switching circuit in opposite senses to variations in ambient conditions detected by the sensor devices.

---

The present invention relates to control circuits for operating load devices, and more particularly concerns alternating current, phase controlled circuits having a controlling switching device for regulating the operation of loaded devices, such as gaseous discharge lamps.

It is an object of the invention to provide an improved control circuit of the above type incorporating sensing means responsive to ambient conditions for operating a load such as a gaseous discharge lamp in accordance with variations in such conditions.

Another object of the invention is to provide a control circuit of the above type which is adapted for application to a wide variety of load devices, which controls the operation of the load in response to variations in a number of different types of environmental conditions, either individually or in combination, and which is reliable in operation, compact in form, and relatively inexpensive to manufacture.

Still another object of the invention is to provide a control circuit of the above type which is readily adjusted to be selectively responsive in opposite senses and in predetermined degree to changes in environmental conditions.

Other objects and advantages will become apparent from the following description and the appended claims.

With the above objects in view, the present invention in one of its aspects relates to a circuit for controlling the power applied to load means comprising, in combination, a source of alternating current, load means energized by the alternating current source, controlled switch means connected between the alternating current source and the load means and being normally non-conductive to block current flow to the load means and having control electrode means to render it conductive, actuating means connected to the alternating current source and to the control electrode means for applying a control signal to the control electrode means at a predetermined time in each alternating current cycle, the actuating means including a resistance and a main capacitance connected together in series and voltage sensitive symmetrical switch means connected across the main capacitance in series discharge relation therewith, sensor circuit means including sensor means and a capacitor connected in series across a portion of the resistance and having lower impedance than the resistance, and an auxiliary capacitance connected to the sensor circuit means and across the main capacitance for modifying the impedance level of the actuating means during operation of the sensor circuit means.

The invention will be better understood from the following description taken in conjunction with the accompanying drawing, in which:

The single figure is a circuit diagram of an embodiment of a load control circuit incorporating a sensing circuit arrangement in accordance with the invention.

Referring now to the drawing, there is shown a phase controlled switching circuit for controlling the current and voltage applied to a load 1, which may be a gaseous discharge lamp such as a sodium vapor or mercury vapor lamp, or may be of other forms of variable impedance loads, the load being connected to terminals 2 of a source of alternating current, typically 220 volts, by supply lines 3 and 4. Ballast inductive reactance 6 is connected in supply line 3 in series with lamp load 1 to provide current limiting impedance, as conventional in discharge lamp circuits. Arranged in supply line 4 in series with load 1 is a triac 5, which may be described as an alternating current semiconductor controlled switch having a single control electrode 5a which, when gated by a signal impulse, causes the switch to conduct current as indicated by the forward bias condition of the semiconductor. A triac may also be described as a bidirectional triode for gate control of alternating current power.

A signal generating or actuating circuit 23 for gating switch 5 comprises series-connected resistance 10 (composed of resistors 10a, 10b) and charging capacitor 11 connected across terminals 2, thereby synchronizing the signal generating function with the source voltage. A discharge loop in actuating circuit 23 for discharging capacitor 11 includes a symmetrical (i.e. bi-laterally conducting) voltage sensitive switch 12, such as a diac trigger, connected at one side to control electrode 5a via current limiting resistor 14 and at the other side to the junction of resistor 10b and charging capacitor 11. Switch 12 may also be described as a bidirectional trigger diode. This device becomes conductive only upon application of a predetermined voltage thereon and is roughly equivalent to a neon glow lamp, but differs therefrom in being a solid state device and, further, breaks down and operates at lower voltages than the neon glow lamp. As shown, diac 12 is effectively connected in series discharge relation with capacitor 11 and control electrode 5a and serves therewith to provide a discharge loop when the voltage on capacitor 11 reaches the breakdown level of diac 12. Thus, when a control signal is applied to electrode 5a by the actuating circuit on each half cycle, triac 5 is gated through its control electrode 5a so as to conduct in opposite directions on alternate half cycles. The time in the half cycle in which the switch 5 is gated is adjustable by the level of resistance 10, and for this purpose resistor 10a is usually a variable resistor as shown. The control of the delay or advance in the time of the alternating current input cycle at which the control signal impulse is applied to render the triac conductive, thereby dictating the load power level, is known as phase controlling. Phase control actuating means of similar function are disclosed in U.S. Pat. 3,249,807—Nuckolls.

Resistor 15 connected across diac 12 provides stabilizing maximum impedance for the latter element.

Also incorporated in the control circuit is an integrating network 17 comprising series connected resistor 18 and capacitor 19 connected as shown across inductive reactor 6, and resistance 10 is connected to network 17 at the junction of resistor 18 and capacitor 19. Integrating network 17 is thus driven by reactor voltage to effect a current feedback voltage which is added to the source voltage and this total voltage is applied to energize actuating circuit 23. The feedback voltage produced in integrating network 17 is a function of the reactor current on the last half cycle and the total voltage applied to actuating circuit 23 by operation of integrating network 17 thus serves to stabilize load current over wide variations in load impedance. Network 17 in addition serves to force current symmetry which might otherwise be adversely affected by various factors. A similar arrangement and function of network 17 are disclosed in U.S. Pat. 3,344,-311—Nuckolls.

Capacitor 20 connected across load 1 forms a resonant circuit with inductor 6 and provides a high starting voltage and maximum operating stability to lamp load 1, as well as providing a path for triac holding current to flow prior to load current buildup.

In accordance with the invention, a sensing and feedback circuit 21 is connected to the described phase control circuit for the purpose of regulating the operation of load 1 in accordance with various ambient or environmental conditions. Thus, in the case where load 1 is a discharge lamp, its light output may be adjusted in accordance with such conditions as fog, smog, rain, overcast, daytime or darkness, the approach of vehicles, traffic flow rate, or various other phenomena of weather or environmental conditions. In the sensing circuit embodiment illustrated, a plurality of different sensing devices A–E are connected in parallel with one another and the bank of sensors connected across resistor 10b. Sensors A–E may include, for example, a cadmium sulfide photoelectric cell for sensing light levels, a moisture sensing device, an atmospheric pressure sensing device, a reed switch for sensing magnetic fields, and a thermistor or bimetal switch for sensing heat levels. If necessary or desirable, the level setting of the influence of each sensing device may be made by placing a potentiometer (not shown) in series or in parallel with each of them. In this manner, a variety of sensors having different impedance levels can be used. The sensor devices may be connected in parallel as shown or individually, if desired. The steady state operating wattage of the load can be set at the desired level by suitable adjustment of variable resistor 10a.

The nature of most sensing devices of the type mentioned is such that they exhibit an effective resistance which changes in magnitude as a function of input.

Connected in series between sensor bank 21 and resistor 10b are capacitor 22 and resistor 24, and connected across charging capacitor 11 as shown are series capacitor 25 and resistor 26. The impedance of the sensor circuit 21 including capacitor 22 and resistance 24 is less than the impedance of resistor 10b.

By means of double throw-double pole switch 27, which may be manually operated to be selectively in contact with positive terminals 28, 28' or negative terminals 29, 29', the connection of sensor bank 21 across resistor 10b may be opened and a connection made to negative terminal 29 connected to supply line 4, such that sensor bank 21 is connected across charging capacitor 11, while at the same time the capacitor 25-resistor 26 branch across capacitor 11 is opened to render it inoperative.

With switch 27 in the positive position shown in the circuit diagram, sensor circuit 21 provides a by-pass for current around resistor 10b and, being lower in impedance than the latter and providing a leading current by virtue of capacitor 22, serves to decrease the RC time constant of the actuating circuit and increase the rate of charging of capacitor 11, thereby shifting the triac firing angle and the load wattage correspondingly. As a result, more power is applied to lamp load 1, and the degree of power increase is dependent on the effective impedance level of the sensor devices as their resistance changes with variations in the ambient conditions to which they are individually sensitive. For example, taking the case where the sensing circuit includes a cadmium sulfide photoelectric cell, the photoelectric cell may be exposed to the lights of an approaching car so that with the circuit connection shown in the drawing, lamp 1 has increased light output to raise the roadway footcandle level during passage of the car and thereafter returns to lower power level after the car passes.

When switch 27 is moved to the negative position in contact with terminals 29, 29', the circuit operates in the reverse sense, that is, with lower resistance in the sensing device, e.g., the photoelectric cell, the less power is applied to the lamp load 1. This is because in the negative position of switch 27, sensor circuit 21 is now connected across charging capacitor 11 of the triggering circuit, and capacitor 22 adds capacitance to the RC time constant circuit which now takes longer to reach the breakdown level of diac 12, thus delaying the gating of triac 5 and reducing the power applied to lamp 1. Such an arrangement is suitable where it is desired to use the photocell sensor to detect ambient light level whereby lamp load 1 has higher light output in response to lower ambient light level, and vice-versa.

With switch 27 in the positive position shown in the drawing, the branch comprising capacitor 25 and resistor 26 is connected across charging capacitor 11, and capacitor 25 serves in this arrangement to linearize the feedback effect of the sensors and to modify the trigger circuit impedance level so that low cost sensor devices can be employed. In the absence of such a branch, the average impedance level of the sensors would be too low, such that the control range would be severely limited and the load power would normally be too high in the positive position of switch 27.

Resistor 24 in series with capacitor 22 provides a minimum resistance discharge path and thus limits the peak current in this branch. Resistor 26 in series with capacitor 25 prevents rapid discharge of the latter capacitor through symmetrical switching diode 12 and triac gate electrode 5a during breakdown of diode 12.

In addition to its functions previously mentioned, integrating network 17 provides functional stability in the described circuit even though the sensor circuit demands wide and rapid load level changes.

In a typical circuit in accordance with the invention, the following components shown in the drawing have the indicated values:

Capacitors (microfarad):
19 _____ .047
11 _____ .056
22 _____ .82
25 _____ .23
20 _____ .15

Resistors (ohms):
18 _____ 180K
10a _____ 82K
10b _____ 180K
24 _____ 1K
26 _____ 1K
15 _____ 15K
14 _____ 10

There is thus provided by the invention a relatively simple phase control system incorporating a flexible sensing and feedback trigger arrangement which readily and economically provides desired load response to various weather phenomena and other environmental conditions.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A circuit for controlling the power applied to load means comprising, in combination, a source of alternating current, load means energized by said alternating current source, controlled switch means connected between said alternating current source and said load means and being normally non-conductive to block current flow to said load means and having control electrode means to render it conductive, actuating means connected to said alternating current source and to said control electrode means for applying a control signal to said control electrode means at a predetermined time in each alternating current cycle, said actuating means including a resistance and a main capacitance connected together in series and voltage sensitive symmetrical switch means connected across said main capacitance in series discharge relation therewith, sensor circuit means including sensor means and a capacitor connected in series across a portion of said resistance and having lower impedance than said resistance, and an auxiliary capacitance connected to said sensor circuit means and across said main capacitance for modifying the impedance level of said actuating means during operation of said sensor circuit means.

2. A circuit as defined in claim 1, and double switch means for selectively connecting said sensor circuit means across said portion of said resistance and said auxiliary capacitance across said main capacitance or connecting said sensor circuit means in series with said resistance and across said main capacitance and disconnecting said auxiliary capacitance from said main capacitance.

3. A circuit as defined in claim 1, including integrating circuit means connected between said load means and said acutating means for stabilizing the load current and providing load current symmetry.

4. A circuit as defined in claim 3, including a first current limiting resistor in series with said capacitor in said sensor circuit means.

5. A circuit as defined in claim 4, including a second current limiting resistor in series with said auxiliary capacitance.

6. A circuit as defined in claim 5, said controlled switch means comprising a triac having a single control electrode.

7. A circuit as defined in claim 2, including integrating circuit means connected between said load means and said actuating means for stabilizing the load current and providing load current symmetry, a first current limiting resistor in series with said capacitor in said sensor circuit means, and a second current limiting resistor in series with said auxiliary capacitance.

8. A circuit as defined in claim 1, said resistance comprising a variable resistor in series with said sensor circuit means.

9. A circuit as defined in claim 1, said sensor circuit means comprising a plurality of parallel-connected variable resistance sensing devices.

References Cited
UNITED STATES PATENTS

| | | | |
|---|---|---|---|
| 3,222,572 | 12/1965 | Powell | 315—156 X |
| 3,328,673 | 6/1967 | Nuckolls | 315—156 X |
| 3,449,629 | 6/1969 | Wigert et al. | 315—151 |
| 3,473,084 | 10/1969 | Dodge | 250—205 X |

JAMES W. LAWRENCE, Primary Examiner

C. R. CAMPBELL, Assistant Examiner

U.S. Cl. X.R.

250—205, 206, 209; 315—156, 157, 158; 323—21, 22